United States Patent [19]

Watanabe et al.

[11] Patent Number: 5,694,064
[45] Date of Patent: Dec. 2, 1997

[54] PEAK DETECTION CIRCUIT AND MAGNETIC STORAGE MEDIUM PLAYBACK APPARATUS

[75] Inventors: Hiroyuki Watanabe; Satoshi Takarada, both of Tokyo, Japan

[73] Assignee: Aiwa Co., Ltd., Tokyo, Japan

[21] Appl. No.: 520,447

[22] Filed: Aug. 29, 1995

[30] Foreign Application Priority Data

Aug. 31, 1994  [JP]  Japan .................... 6-207663

[51] Int. Cl.$^6$ .................................. G01R 19/00
[52] U.S. Cl. .................................. 327/62; 327/60
[58] Field of Search .................................. 327/58–62

[56] References Cited

U.S. PATENT DOCUMENTS

| | | | |
|---|---|---|---|
| 3,668,532 | 6/1972 | Potash | 327/58 |
| 3,891,930 | 6/1975 | Petrusson | 327/58 |
| 4,694,200 | 9/1987 | Hetyei | 327/58 |
| 5,272,394 | 12/1993 | Kirk et al. | 327/58 |

*Primary Examiner*—Toan Tran
*Attorney, Agent, or Firm*—Smith-Hill and Bedell

[57] ABSTRACT

A playback signal is supplied to a delay amplifier and a noise comparator. The delayed playback signal is supplied to a comparator, which compares the delayed playback signal with the playback signal and provides a first comparison signal to a pulse adjustment circuit. The noise comparator compares the playback signal with threshold signals and provides a second comparison signal to the pulse adjustment circuit. The pulse adjustment circuit generates the peak detection signal at each point when the signal level of the first comparison is inverted, and determines the peak detection signal to be invalid when the signal level of the playback signal falls within the range between the threshold signals. A read signal is generated based on the valid peak detection signal.

15 Claims, 14 Drawing Sheets

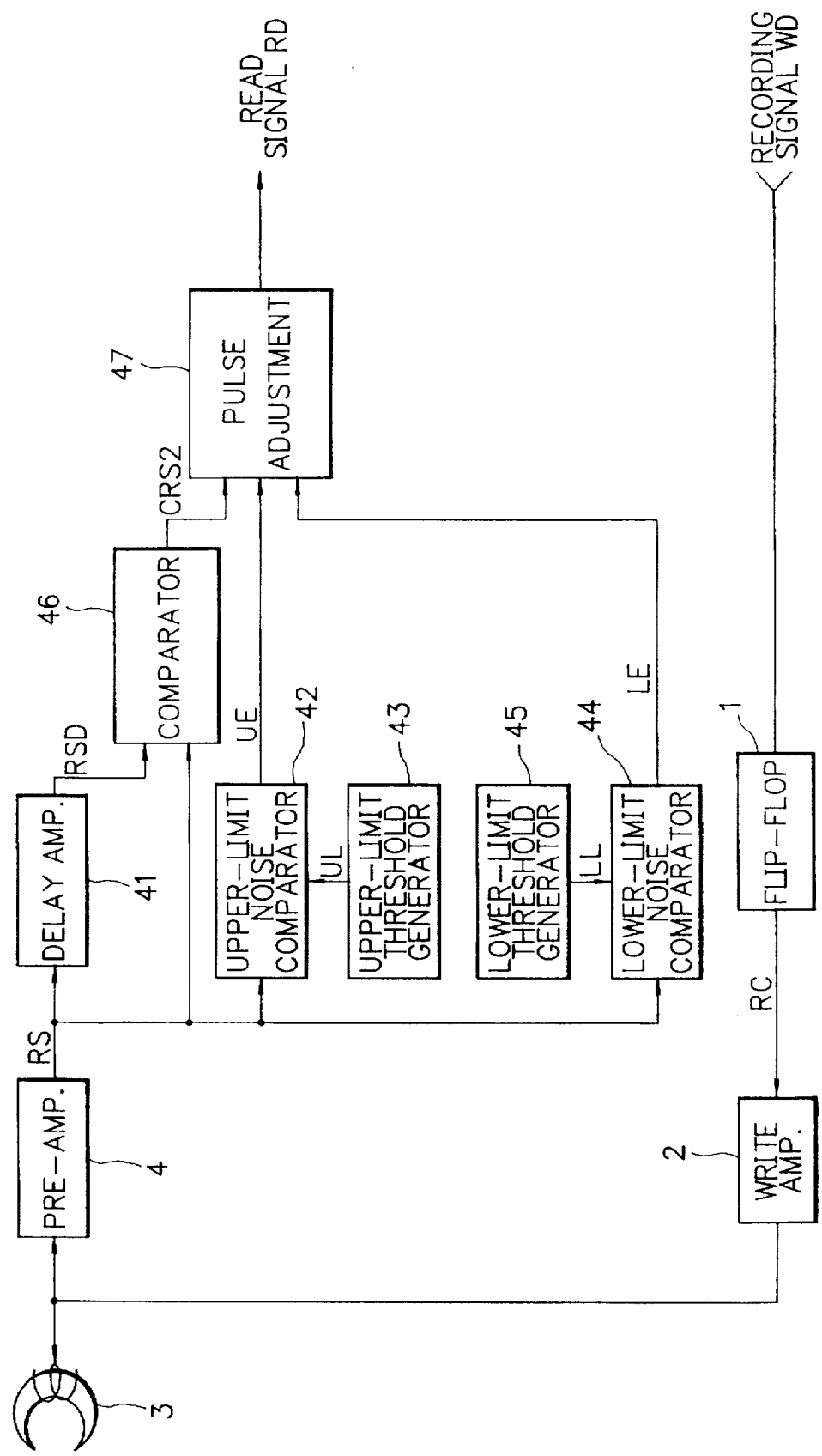

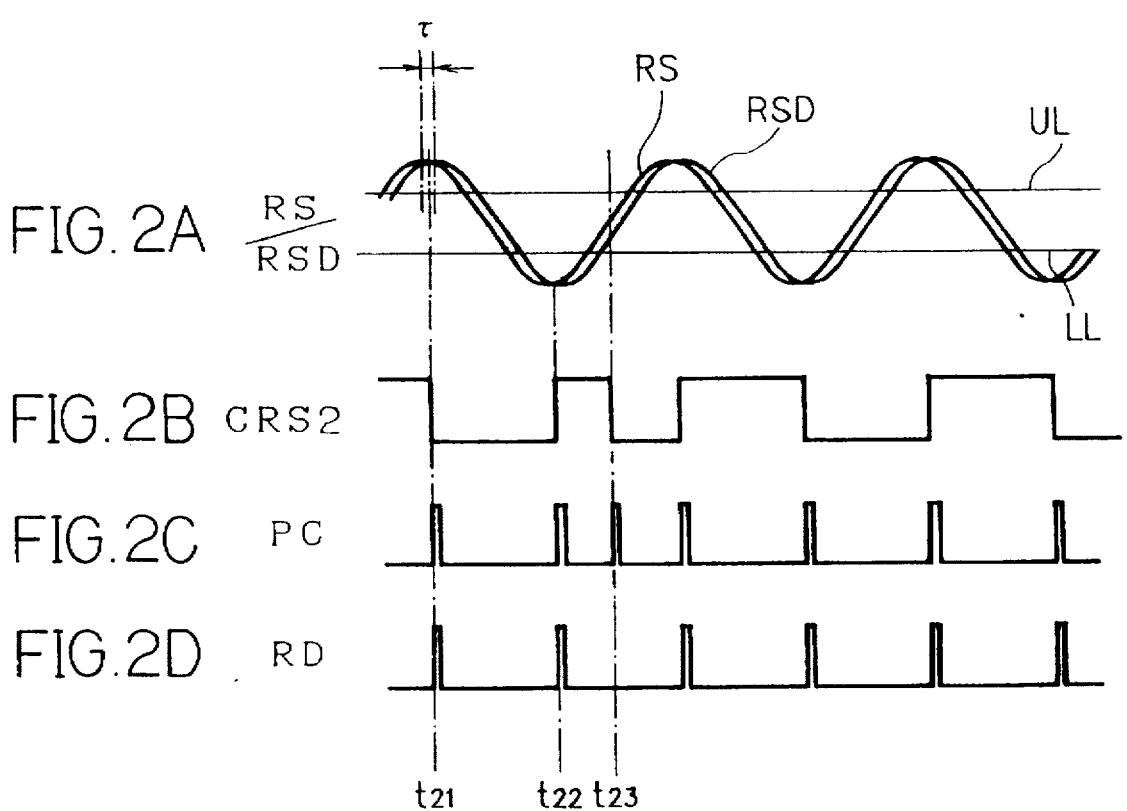

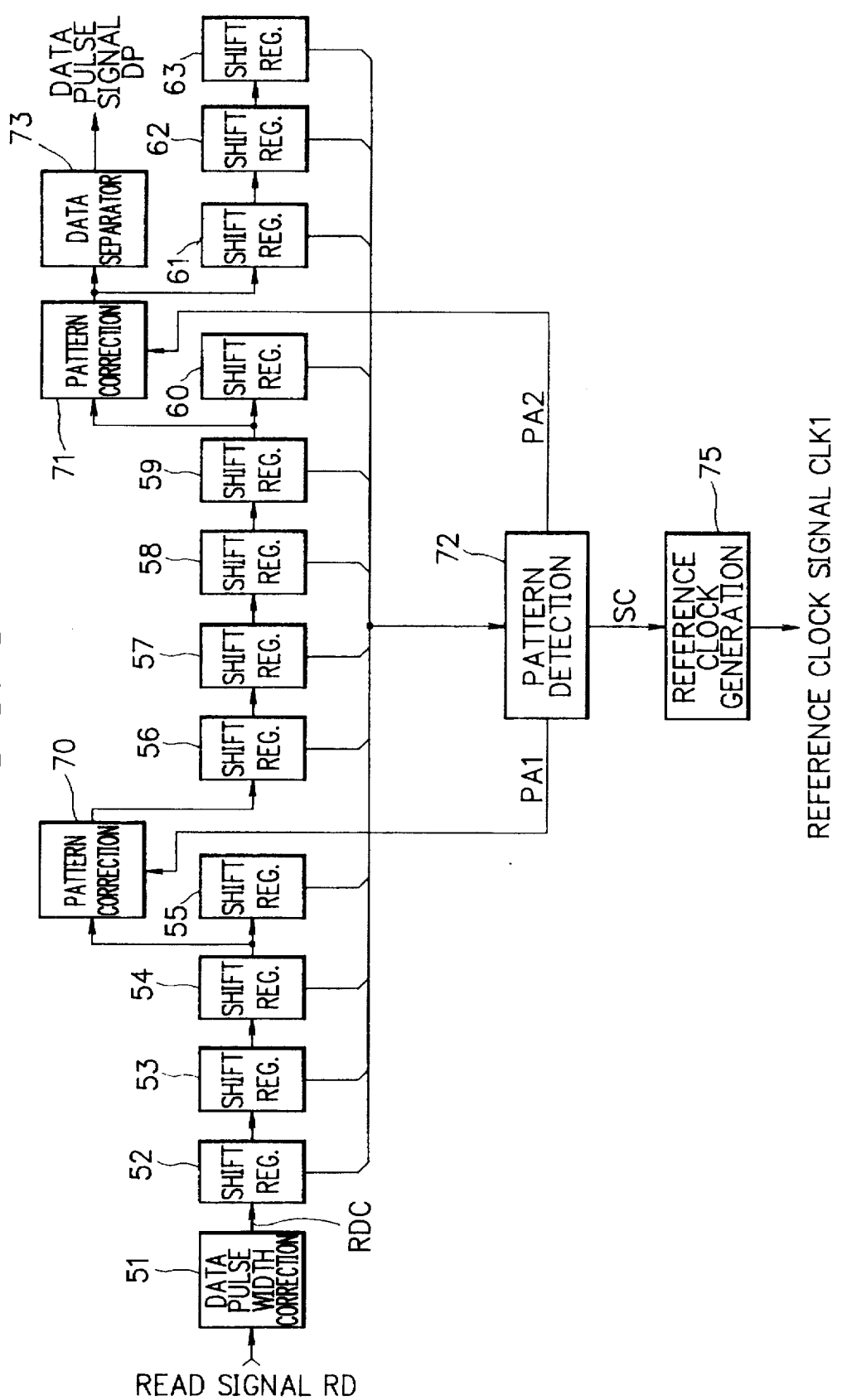

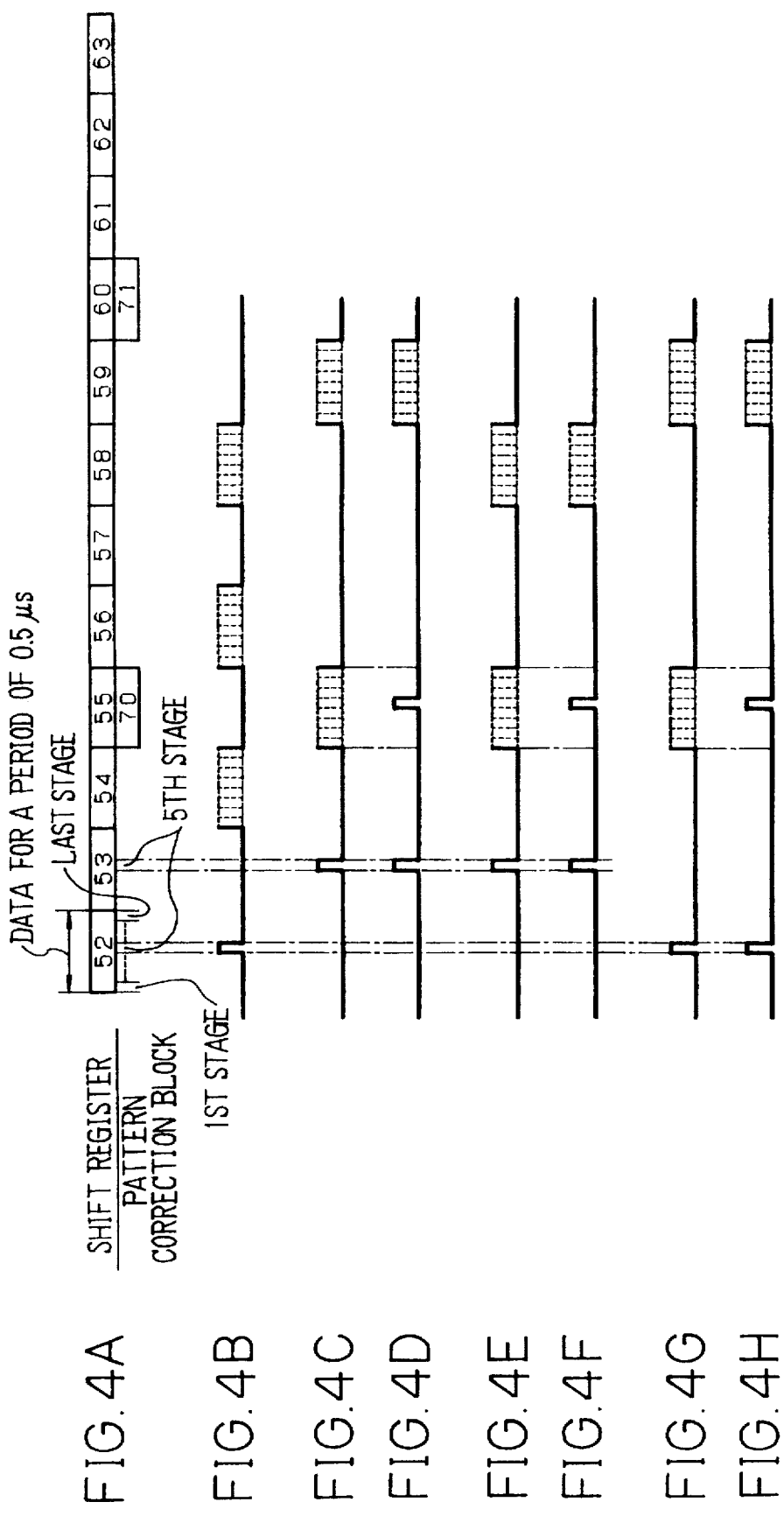

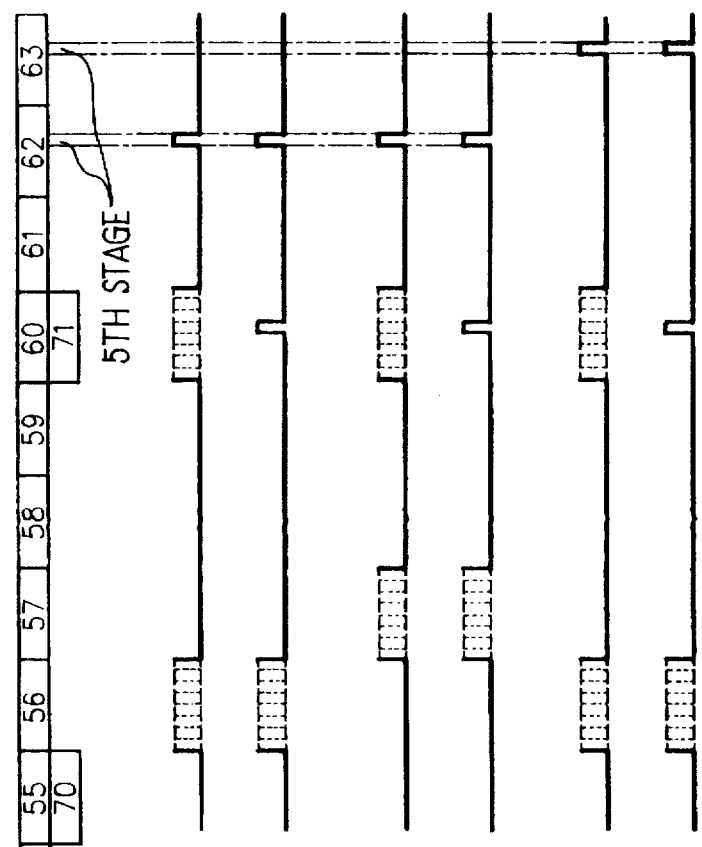

FIG. 6
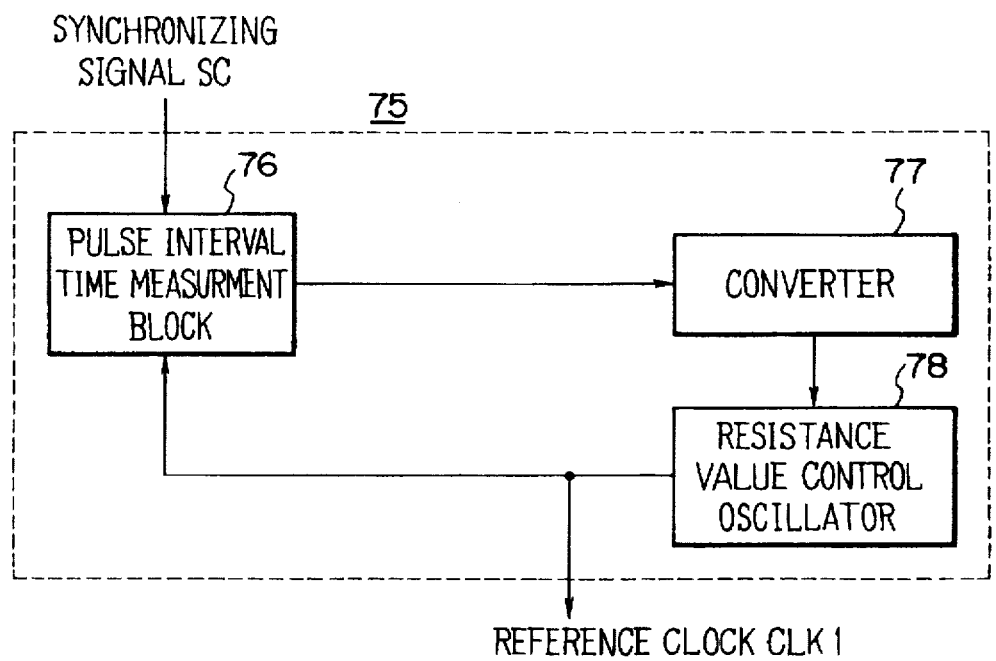
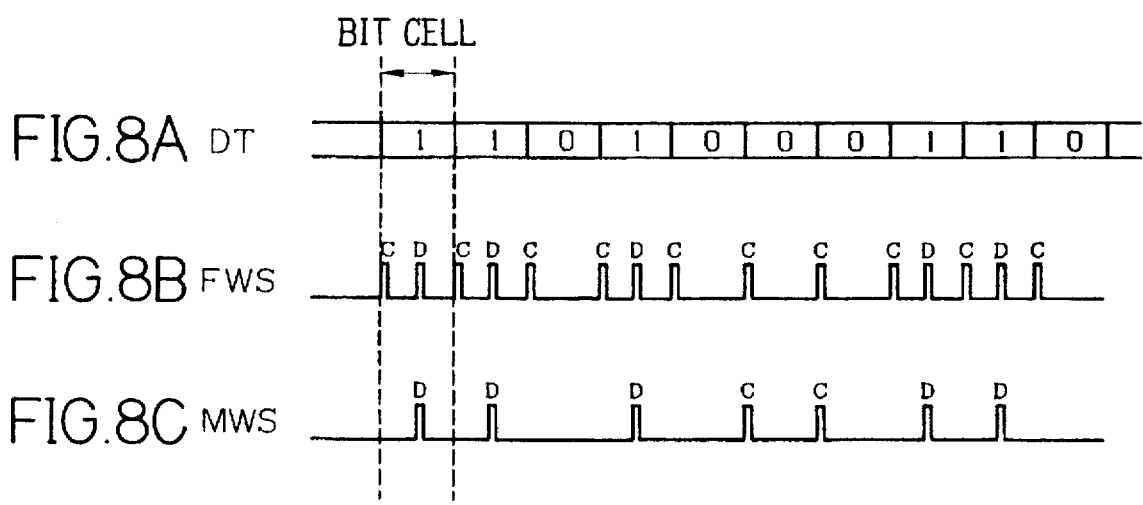

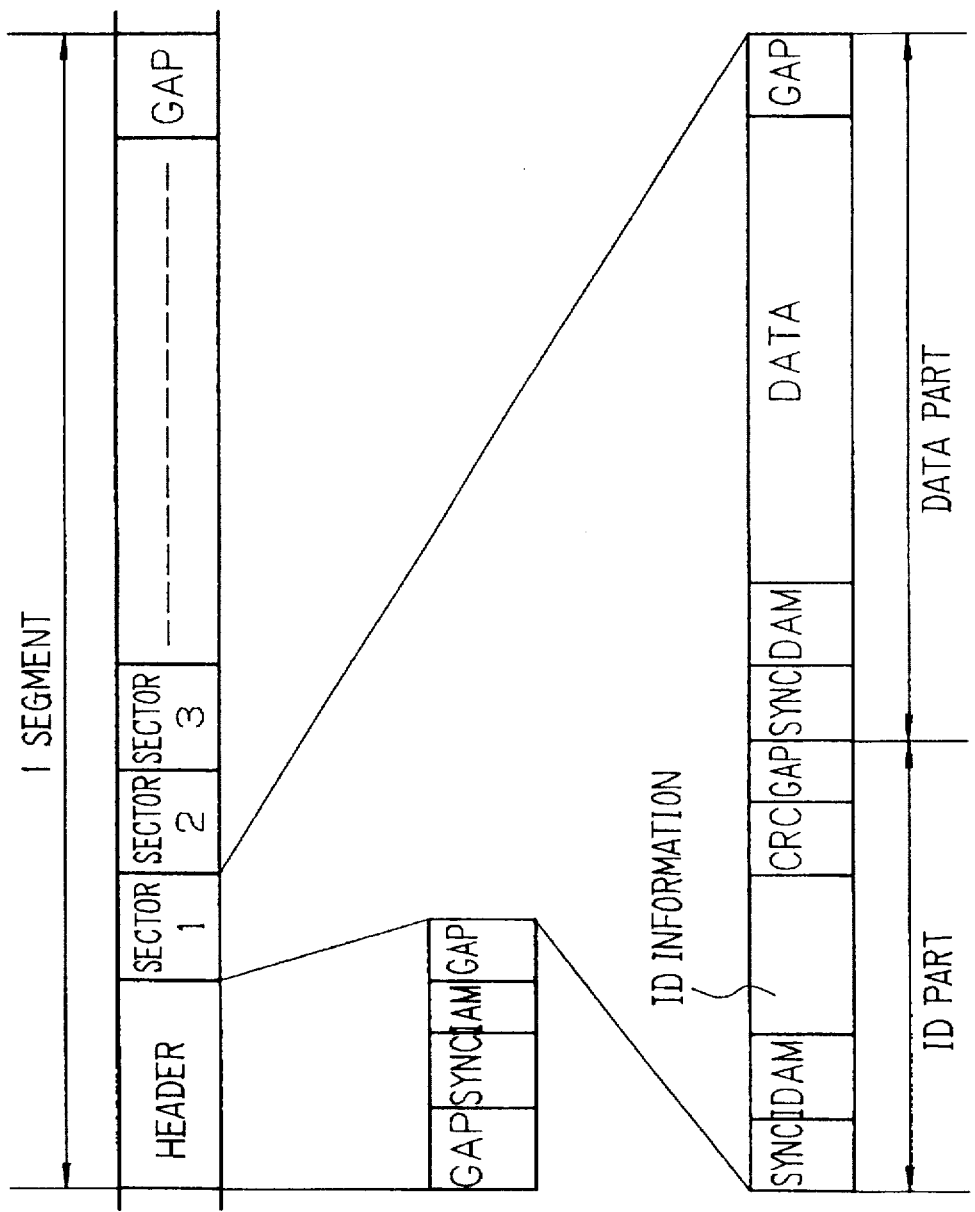
FIG. 7A (PRIOR ART) SEGMENT
FIG. 7B (PRIOR ART) HEADER
FIG. 7C (PRIOR ART) SECTOR

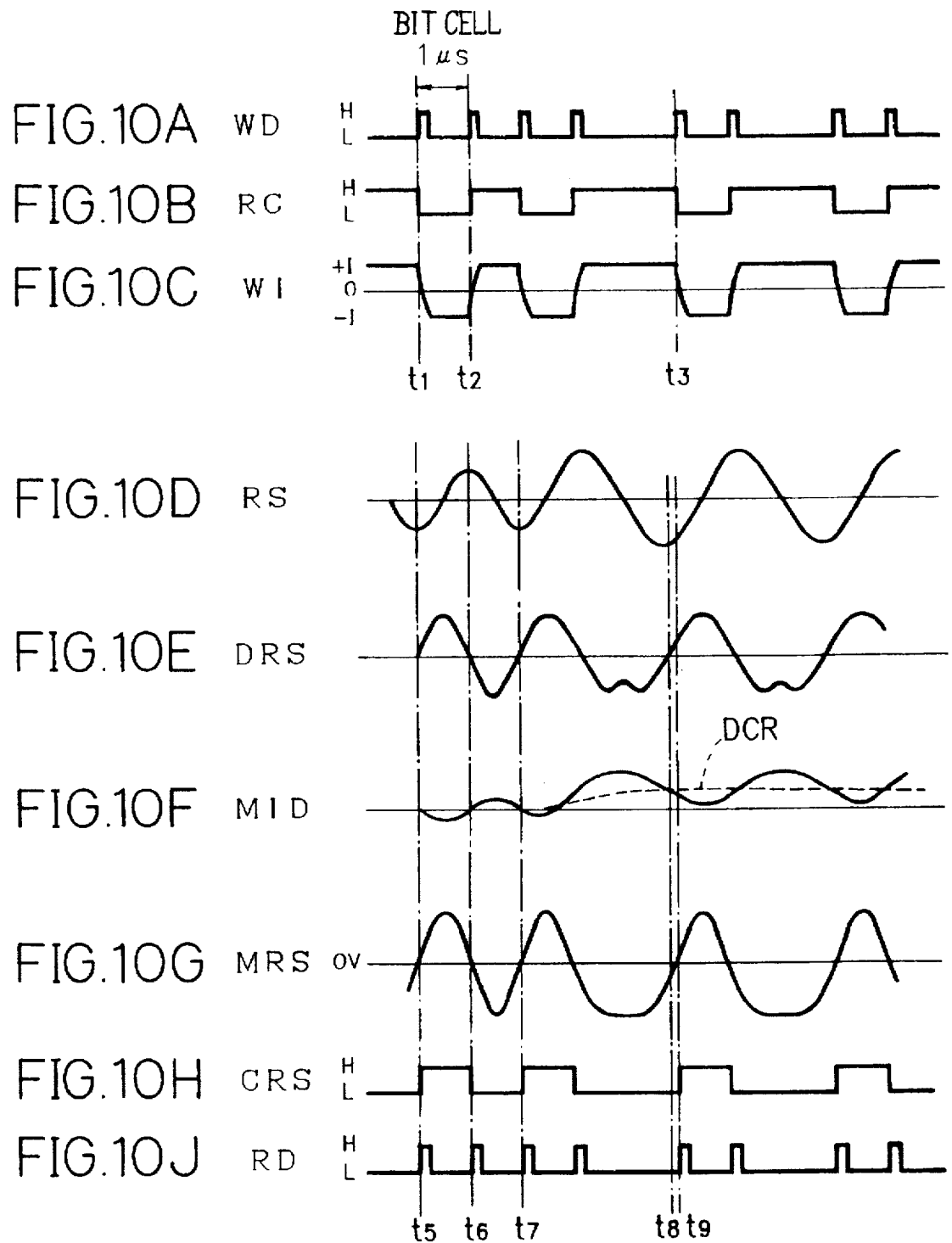

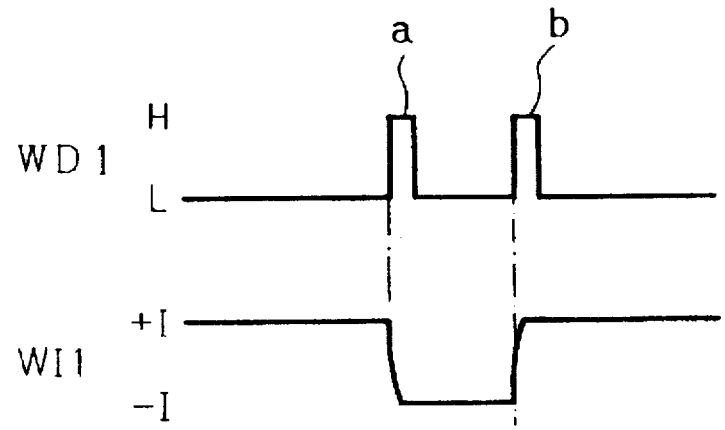
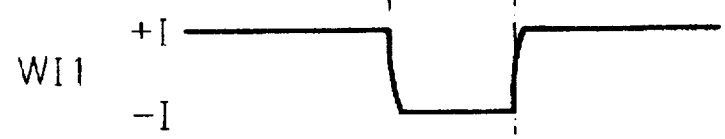
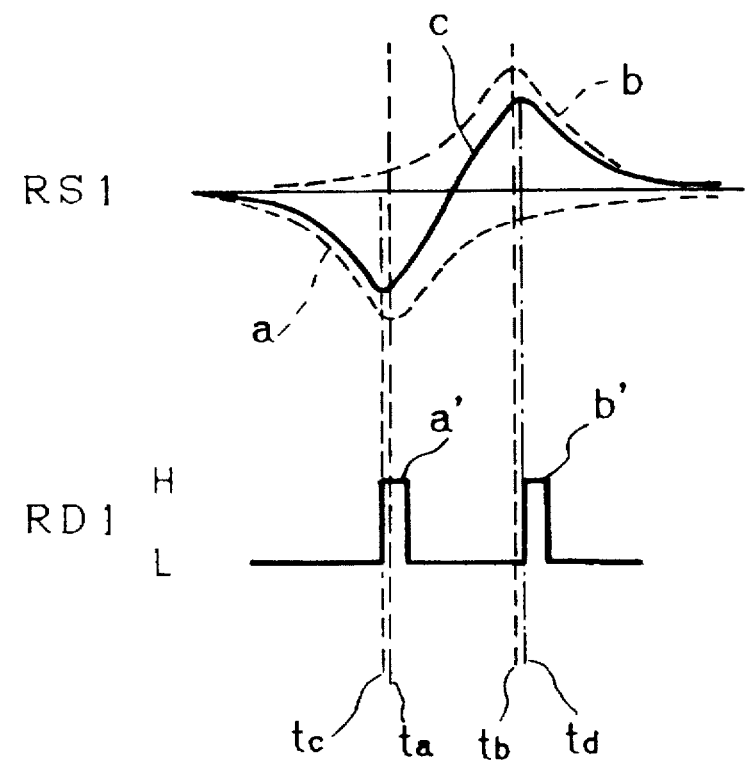

FIG. 13
(PRIOR ART)
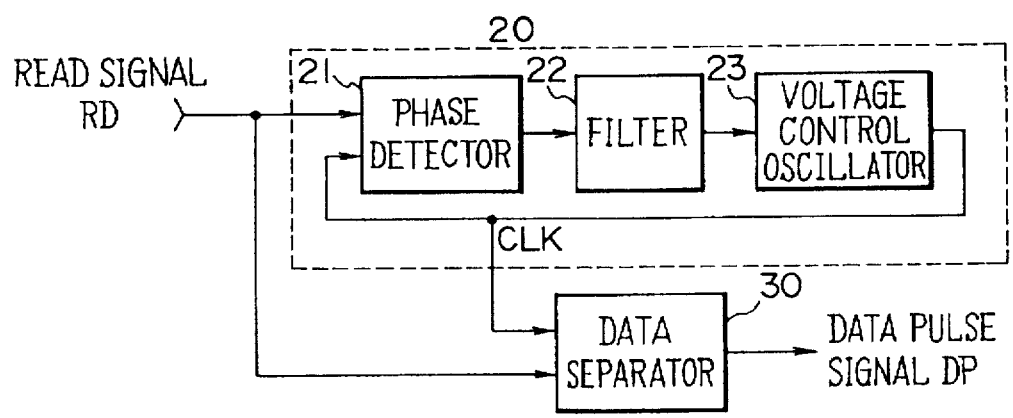
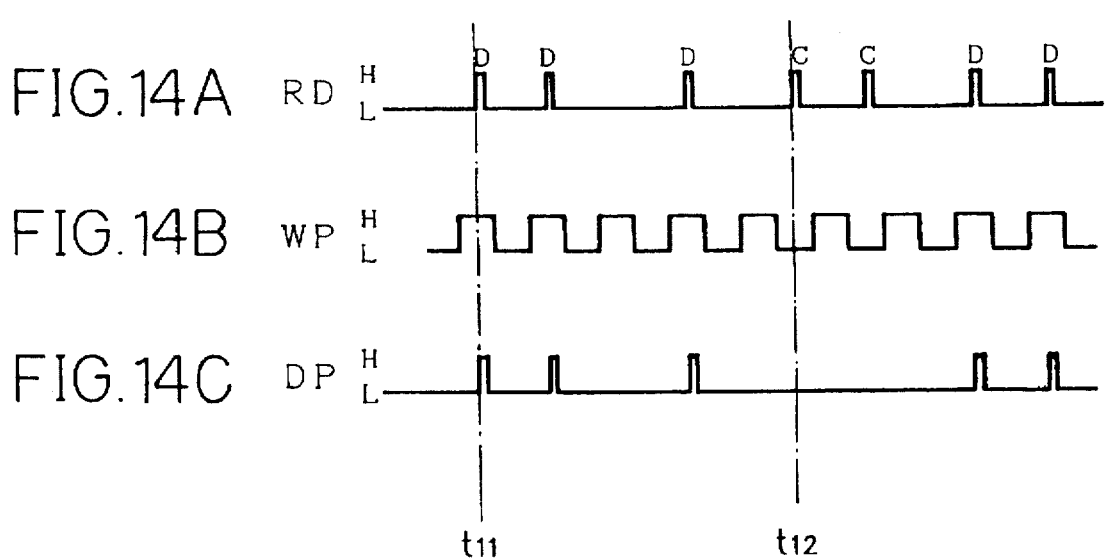

PEAK DETECTION CIRCUIT AND MAGNETIC STORAGE MEDIUM PLAYBACK APPARATUS

BACKGROUND OF THE INVENTION

1. Field of the Invention

This invention relates to a peak detection circuit for detecting a peak of a playback signal provided from a magnetic storage medium such as a magnetic tape or a floppy disk and to a magnetic storage medium playback apparatus using the circuit.

2. Description of the Related Art

Currently, with a floppy disk unit or a data streamer unit for the backup of data stored in a hard disk unit, digital data are recorded on a storage medium such as a floppy disk or a cartridge tape with a format configuration as shown in FIG. 7.

In general, on the magnetic storage media, one or more segments are formed onto each track, and the configuration of one segment on the magnetic storage media is shown in FIG. 7A. One segment is comprised of a header, sectors, and a gap. The header is an area which is used in order to make the data recorded in the sectors are read appropriately. The sectors are areas where the data are recorded. The gap is a blank which separates the next segment.

The header is constructed as shown in FIG. 7B, where the "GAP" represents a blank area and the "SYNC" represents a synchronizing signal. The "IAM" represents an index address mark which indicates the header.

The sector is comprised of an ID portion and a data portion as shown in FIG. 7C. An attribute for the sector is recorded in the ID portion, and data are recorded in the data portion. The "GAP" represents a blank area, and the "SYNC" represents a synchronizing signal. The "IDAM" is an ID address mark which indicates the ID portion, and ID information such as a sector number and the length of the data are recorded in the "ID information" area. The "CRC" represents a cyclic code which is used for error detection. The "DAM" in the data portion represents a data address mark which indicates the data portion, and data are recorded in the "DATA" area.

When a data signal is recorded on the magnetic storage medium in the format configuration, the data signal is modulated by a FM method or a MFM method in order to be recorded on the magnetic storage medium.

For one bit of the data signal, the signal is generated in a unit which is called a bit cell. In the FM method, a clock pulse is recorded at the head of each bit cell, and a data pulse is recorded in the middle of each bit cell. In the MFM method, the data pulse is recorded in the middle of each bit cell, and the clock pulse is recorded at the head of the relevant bit cell only when no data are recorded (the data is "0") in the current and present bit cells.

FIG. 8 shows data signals modulated by the FM and MFM methods. With the FM method, the data signal DT shown in FIG. 8A is converted into a recording signal FWS shown in FIG. 8B, where the reference character "C" on the recording signal FWS represents the clock pulse and the reference character "D" represents the data pulse. With the MFM method, the data signal DT is converted into a recording signal MWS shown in FIG. 8C, where the reference character "C" on the recording signal FWS also represents the clock pulse and the reference character "D" also represents the data pulse.

With the MFM method, when the time intervals between the bit cells of the recording signal MWS shown in FIG. 8C are shortened by half, the time intervals are equal to those in the FM method, and it is possible to record the data at a density level double that of the FM method. Accordingly, when the digital data are recorded in the high density, the data are generally recorded using the MFM method.

FIG. 9 shows a construction of a conventional magnetic recording storage medium playback apparatus which plays back the data signal from a magnetic storage medium and provides a playback signal. The data signal is recorded at a transmission speed of, for example, 1 megabit/second (the interval between the bit cells =1 µs).

A recording signal WD into which the data signal DT is modulated, is supplied to a flip-flop 1. The flip-flop 1 generates a recording current control signal RC in which the logic level is inverted, synchronized with a rise of the recording signal WD. The recording current control signal RC is supplied to a write amplifier 2. The write amplifier 2 generates a recording current WI based on the recording current control signal RC, which is then supplied to a magnetic head 3. The magnetic head 3 generates a residual flux based on the recording current WI which is recorded on a magnetic storage medium (not shown).

When the magnetic storage medium on which the data signal DT is recorded, is played back, the magnetic storage medium (not shown) is played back using the magnetic head 3, so that a playback signal RS is outputted from a pre-amplifier 4. The playback signal RS is supplied to a differentiator 5, an integrator 6, and a direct current signal generator 7.

The differentiator 5 differentiates the playback signal RS, generating a differentiated signal DRS. In order to correct a peak shift described below, the integrator 6 integrates the playback signal RS in order to provide an integrated signal IRS, and the direct current signal generator 7 generates a direct current signal DCR based on the playback signal RS.

The integrated signal IRS and the direct current signal DCR are supplied to an adder 8, which provides an added signal MID and such signal is provided and is supplied to a subtractor 9. The subtractor 9, upon receiving the differentiated signal DRS from the differentiator 5, subtracts the added signal MID from the differentiated signal DRS to produce a synthesized signal MRS. The synthesized signal MRS is supplied to a zero-volt comparator 10.

The zero-volt comparator 10 outputs the comparison signal CRS at a high level "H" when the synthesized signal MRS is above 0 volts, and outputs the comparison signal CRS at a low level "L" when the synthesized signal MRS is below 0 volts. The comparison signal CRS is supplied to a pulse shaping circuit 11.

The pulse shaping circuit 11 generates a pulse signal synchronized with an inverted signal level of the comparison signal CRS and provides a read signal RD.

Referring to FIG. 10, the operation of the magnetic storage medium playback apparatus is described below. FIG. 10A shows the recording signal WD. At point t1, when the recording signal WD is increased to the high level H, the recording current control signal RC outputted from the flip-flop 1 shown in FIG. 10B, is inverted from the high level H into the low level L. Based on the recording current control signal RC, the recording current WI at "−I" is supplied to the magnetic head 3 as shown in FIG. 10C so that the signal can be recorded on the magnetic storage medium.

At point t2 after one bit cell period has passed, when the recording signal WD is increased to the high level H, the recording current control signal RC is inverted into the high level H, and the recording current WI at "+I" is supplied to the magnetic head 3 so that the signal is recorded on the magnetic storage medium.

Thereafter, the recording current control signal RC is inverted, synchronized with the inversion of the recording signal WD, and the recording current WI at "–I" or "+I" is supplied to the magnetic head 3 so that the signal can be recorded on the magnetic storage medium.

When the signal recorded on the magnetic storage medium is played back with the magnetic head 3, the playback signal RS shown in FIG. 10D is outputted from the pre-amplifier 4. For example, when a datum at the position on the magnetic storage medium at point t1 is played back, the playback signal RS at point t5 is outputted, and when a datum at the position at point t2, the playback signal RS at point t6 is outputted.

The playback signal RS is supplied to the differentiator 5, where the differentiated signal DRS shown in FIG. 10E is generated. The adder 8 adds the integrated signal IRS from the integrator 6 to the direct current signal DCR from the direct current generator 7 in order to provide the added signal MID shown in FIG. 10F. The subtractor 9 subtracts the added signal MID from the differentiated signal DRS in order to provide a synthesized signal MRS as shown in FIG. 10G.

The synthesized signal MRS is compared with 0 volts in the zero-volt comparator 10. For example, the synthesized signal MRS between points t5 and t6 is above 0 volts, and the comparison signal CRS at the high level H is outputted from the zero-volt comparator 10. Where it is less than 0 volts between points t6 and t7, the comparison signal CRS at the low level L is outputted.

The comparison signal CRS is supplied to the pulse shaping circuit 11, which generates a pulse signal for a predetermined length of time, synchronized with the inversion of the signal level of the comparison signal CRS in order to provide the read signal RD.

When a unit of datum on the magnetic storage medium positioned at point t3 is played back, the peak signal level of the playback signal RS is determined to be the earlier point t8, rather than point t9 which corresponds to point t3 due to the above-described peak shift.

A peak shift is described below with reference to FIG. 11. When the recording signal WD1 shown in FIG. 11A includes only the pulse signal "a", the recording current WI1 shown in FIG. 11B is switched from "+I" to "–I", synchronized with a rise of the pulse signal "a", and the signal is recorded on the magnetic storage medium. The playback signal RS1 from the magnetic storage medium which is outputted from the pre-amplifier 4 corresponds to the signal defined by the dashed line "a" in FIG. 11C.

When the recording signal WD1 includes only the pulse signal "b", the recording current WI1 is switched from "–I" to "+I", synchronized with a rise of the pulse signal "b", and the signal is recorded on the magnetic storage medium. The playback signal RB1 from the magnetic storage medium corresponds to the signal defined by the dashed line "b".

When the recording signal WD1 includes the pulse signals "a" and "b", the recording current WI1 is switched from "+I" to "–I", synchronized with a rise of the pulse signal "a", and is thereafter switched from "–I" to "+I", synchronized with a rise of the pulse signal "b", and the signal is recorded on the magnetic storage medium. The playback signal RS1 from the magnetic storage medium corresponds to the signal defined by the solid line "c" over which the signals defined by the dashed lines "a" and "b" are overlaid. As a result, the peak signal level of the playback signal RS is shifted from point ta (when the playback signal RS includes only the pulse signal "a") to point tc, and is shifted from point tb (when the playback signal RB includes only the pulse signal "b") to the point td. Accordingly, when the peak value of the signal level of the playback signal RS is detected from the read signal RD1, the playback signal WD1 cannot be correctly played back because the pulse signals "a" and "b" in the recording signal WD1 shown in FIG. 11D are determined to be pulse signals "a'" and "b'".

With the MFM method, there are six kinds of signal patterns which cause the peak shift, as shown from FIG. 12A to 12F, where the arrows represent the direction in which the pulse signal is shifted by the peak shift. The time values expressed in the figure are based on a data transmission speed of 1 megabit/second (the interval between the bit cells=1 μs).

The peak shift in the playback signal RS of which the peak signal level is determined at points t8 shown in FIG. 10, is corrected by the calculation of subtracting the added signal MID from the differentiated signal DRS. Accordingly, the synthesized signal MRS is 0 volts at point t9, which corresponds to point t3, so that the read signal RD which is equal to the recording signal WD is obtained. As described above, it is possible to obtain the read signal RD which is equal to the recording signal WD from the playback signal RS by the detection of the peak signal level in the playback signal RS and the peak shift correction.

When the data signal DT is demodulated from the read signal RD, the clock pulse and the data pulse are separated, and a data signal DT is generated, based on the obtained data pulse signal DP. FIG. 13 shows construction of a data separation block for separating the clock pulse and the data pulse from the read signal RD.

In FIG. 13, the read signal RD is supplied to a phase detector 21 in a PLL circuit 20 and to a data separator 30. The phase detector 21 receives a reference clock signal CLK which is outputted from a voltage control oscillator 23 described below, compares the phase of the synchronizing signal in the data signal of the format configuration shown in FIG. 7 with the phase of the reference clock signal CLK, and provides a phase difference signal through a filter 22 to the voltage control oscillator 23. With the voltage control oscillator 23, the frequency of the reference clock signal CLK is controlled using the provided phase difference signal. As described above, the reference clock signal CLK is controlled using the synchronizing signal.

The reference clock signal CLK from the voltage control oscillator 23 is supplied to the data separator 30 which also receives the read signal RD. The reference clock signal CLK is used as a data window signal WP for separating the clock pulse and the data pulse from the read signal RD. The operation of the data separator 30 is described below with reference to FIG. 14.

FIG. 14A shows the read signal RD, in which the reference character "C" represents the clock pulse and the reference character "D" represents the data pulse. When the data pulse in the read signal RD is supplied to the data separator 30 at point t11, the data pulse is determined to be valid since the data window signal WP (=the reference clock signal CLK) is set to the high level H. When the clock pulse in the read signal RD is supplied to the data separator 30 at point t12, the clock pulse is determined to be invalid since the data window signal WP is set to the low level L. As described above, the data pulse signal DP shown in FIG. 14C is generated from the valid data pulse of the read pulse RD. Further, the data signal DT is generated using the data pulse signal DP.

However, with the circuit which detects the peak signal level in the playback signal from the storage medium, it is difficult to adjust the characteristics for the differentiator appropriately. Further, the peak signal level cannot be correctly detected due to the change in frequency and in signal level of the playback signal.

OBJECT AND SUMMARY OF THE INVENTION

The object of the present invention is to provide an improved peak detection circuit which can easily detect the signal level of an input signal without error, and to provide an improved storage medium playback apparatus which generates a playback digital signal, based on a peak detection signal which is generated from the playback signal from the storage medium using the peak detection circuit.

In one aspect of the present invention, within a peak detection circuit, a signal delay means delays an input signal by a predetermined time in order to provide a delayed input signal. A peak detection signal generation means compares the signal level of the input signal with the signal level of the delayed input signal provided from the signal delay means, and, when the result of the comparison is inverted, generates a peak detection signal.

Accordingly, the signal level of an input signal is compared with the signal level of the delayed input signal provided from a signal delay means, and a peak detection signal is generated by a peak detection signal generation means when the result of the comparison is inverted. Accordingly, the peak detection signal can be easily generated without necessary adjustment of a characteristic of a differentiator. Further, the peak detection signal can be generated independently of any effects of a change in frequency or in signal level of the playback signal because the input signal is compared with the delayed input signal.

In another aspect of the present invention, within a peak detection circuit, a full-wave rectification means performs full-wave rectification for an input signal in order to provide a full-wave rectified input signal. A signal delay means delays the full-wave rectified input signal provided from the full-wave rectification means by a predetermined time in order to provide a delayed full-wave rectified input signal. A peak detection signal generation means compares the signal level of the full-wave rectified input signal with the signal level of the delayed full-wave rectified input signal provided from the signal delay means, and, when the result of the comparison is inverted, generates a peak detection signal.

Accordingly, the signal level of a full-wave rectified input signal which is generated from the input signal with a full-wave rectification means, is compared with the signal level of the delayed full-wave rectified input signal provided from the signal delay means, and the peak detection signal is generated by the peak detection signal generation means when the result of the comparison is inverted. Accordingly, the peak detection signal can be easily generated without necessary adjustment of a characteristic of a differentiator. Further, the peak detection signal PC can be generated independently of any effects of a change in frequency or in signal level of the playback signal because the full-wave rectified input signal is compared with the delayed full-wave rectified input signal.

In still another aspect of the present invention, within the peak detection circuits described above, a peak detection signal determination means determines the peak detection signal generated in the peak detection signal means to be invalid when the signal level of the input signal falls within a predetermined range.

Accordingly, when the signal level of the input signal falls within a predetermined range, a peak detection signal determination means determines the peak detection signal generated in the peak detection signal means to be invalid. Accordingly, even if the result of the comparison is accidentally inverted due to noise when the signal level of the playback signal falls within the range between predetermined levels, an error-free peak detection signal can be generated because the peak detection signal is determined to be invalid. When a determination is made, based on the full-wave rectified signal, whether or not the signal level of the input signal falls within the range between predetermined levels, the signal levels for the determination are easily set when only one signal level is defined, and this makes the peak detection signal determination means simple.

In yet another aspect of the present invention, within a storage medium playback apparatus, a signal playback means plays back a playback signal from a storage medium. A signal delay means delays a playback signal by a predetermined time in order to provide a delayed playback signal. A peak detection signal generation means compares the signal level of the playback signal with the signal level of the delayed playback signal provided from the signal delay means, and, when the result of the comparison is inverted, generates a peak detection signal. A digital signal generation means generates a playback digital signal based on the peak detection signal.

Accordingly, the signal level of a playback signal from a storage medium is compared with the signal level of the delayed playback signal provided from a signal delay means, and a playback digital signal is obtained based on a peak detection signal generated by a peak detection signal generation means when the result of the comparison is inverted. Accordingly, the peak detection signal can easily be generated without necessary adjustment of a characteristic of a differentiator. Further, the peak detection signal can be generated independently of any effects of a change in frequency or in signal level of the playback signal.

In further aspect of the present invention, within a storage medium playback apparatus, a signal playback means plays back a playback signal from a storage medium. A signal delay means delays a playback signal by a predetermined time in order to provide a delayed playback signal. A peak detection signal generation means compares the signal level of the playback signal with the signal level of the delayed playback signal provided from the signal delay means, and, when the result of the comparison is inverted, generates a peak detection signal. A peak detection signal determination means determines the peak detection signal generated in the peak detection signal means to be invalid when the signal level of the playback signal provided from the signal playback means falls within a predetermined range. A digital signal generation means generates a playback digital signal based on the peak detection signal.

Accordingly, when the signal level of the playback signal falls within a predetermined range, a peak detection signal determination means determines the peak detection signal generated in the peak detection signal means to be invalid. Accordingly, even if the result of the comparison is accidentally inverted due to noise when the signal level of the playback signal falls within the range between predetermined levels, a playback digital signal is obtained because the peak detection signal is determined to be invalid.

Additional objects and advantages of the present invention will be apparent from the following detailed description of a preferred embodiment thereof, which is best understood with reference to the accompanying drawings.

BRIEF DESCRIPTION OF THE DRAWINGS

FIG. 1A is a block diagram showing a construction of a storage medium playback apparatus using a peak detection circuit in a preferred embodiment according to the present invention;

FIGS. 2A–2D referred to collectively as FIG. 2, form a diagram showing the operation of the peak detection circuit in the present invention;

FIG. 3 is a block diagram showing a construction of a peak shift correction circuit in the present invention;

FIGS. 4A–4H referred to collectively as FIG. 4, form a diagram showing the operation of the peak shift correction circuit in the present invention;

FIGS. 5A–5G referred to collectively as FIG. 5, form a diagram showing the operation of the peak shift correction circuit in the present invention;

FIG. 6 s a block diagram showing a construction of a reference clock generator circuit in the present invention;

FIGS. 7A–7C referred to collectively as FIG. 7, form a diagram showing a format configuration currently in use;

FIGS. 8A–8C referred to collectively as FIG. 8, form a diagram showing data signals for the FM method and for the MFM method currently in use;

FIGS. 10A–10J referred to collectively as FIG. 10, form a diagram showing the operation of the magnetic storage medium playback apparatus in the prior art;

FIG. 11A–11D referred to collectively as FIG. 11, form a diagram showing a peak shift in the prior art;

FIG. 13 is a diagram showing a construction of a data separator block in the prior art; and FIG. 14A–14C referred to collectively as FIG. 14, form a block diagram showing the operation of the data separator in the prior art.

DESCRIPTION OF THE PREFERRED EMBODIMENT

Figure 9:
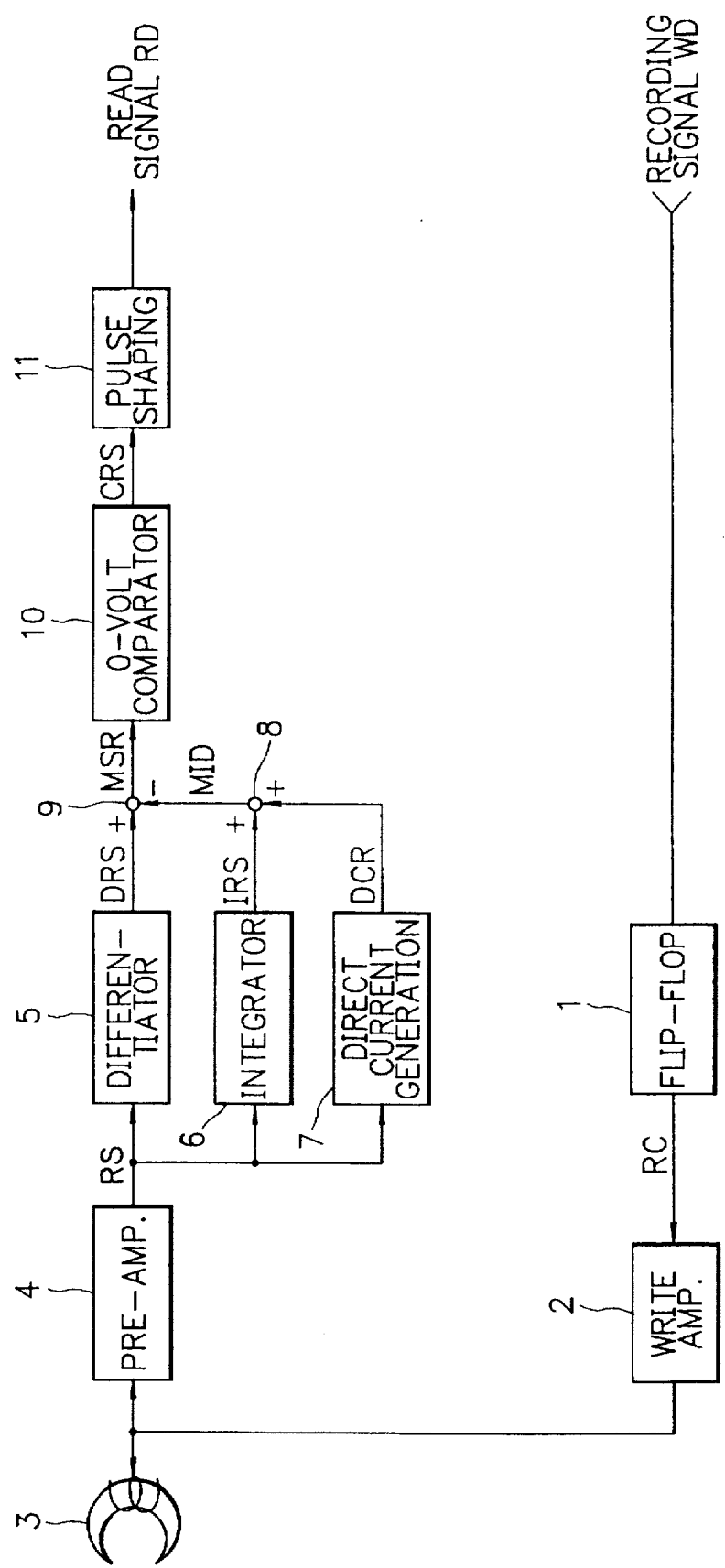
FIG. 9 is a block diagram showing a construction of a magnetic storage medium playback apparatus in the prior art.

A peak detection circuit in a preferred embodiment according to the present invention is described below with reference to FIG. 1A. In FIG. 1A, the same reference numbers are employed to designate like portions shown in FIG. 9 and no additional detailed description is made.

A playback signal RS outputted from a pre-amplifier 4 is supplied to a delay amplifier 41, an upper-limit noise comparator 42, a lower-limit noise comparator 44, and a comparator 46. With the delay amplifier 41, the playback signal RS is delayed for a predetermined time τ, and the delayed playback signal RSD is provided to the comparator 46.

The comparator 46 compares the delayed playback signal RSD with the playback signal RS. A comparison signal CRS2 which indicates the result of the comparison is supplied to a pulse adjustment circuit 47.

The upper-limit noise comparator 42 compares the playback signal RS with a upper-limit threshold signal UL which is supplied from a upper-limit threshold generator 43. An upper-limit comparison signal UE which indicates the result of the comparison is supplied to the pulse adjustment circuit 47.

Similarly, the lower-limit noise comparator 44 compares the playback signal RS with a lower-limit threshold signal LL which is supplied from a lower-limit threshold generator 45. A lower-limit comparison signal LE which indicates the result of the comparison is supplied to the pulse adjustment circuit 47.

Figure 1B:
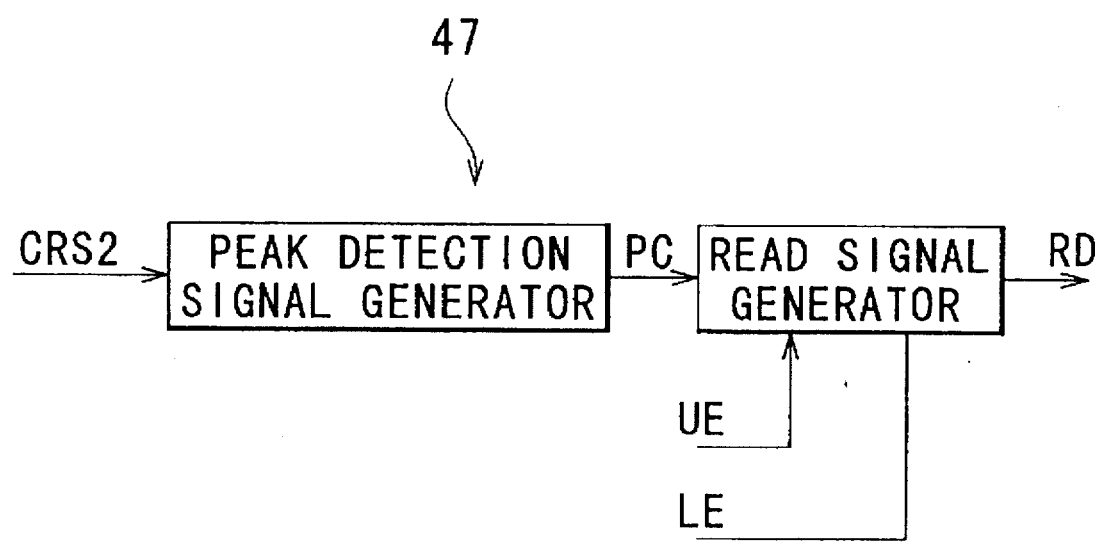
FIG. 1B is a block diagram showing a portion of FIG. 1A in greater detail.

Referring to FIG. 1B, the pulse adjustment circuit 47 includes a peak detection signal generator which generates a peak detection signal PC, synchronized with the inversion of the signal level of the comparison signal CRS2 provided from the comparator 46, and a read signal generator which receives the peak detection signal PC and provides the read signal RD when the peak detection signal PC is validated by the comparison signals UE and LE. When the playback signal RS falls between the range of the upper-limit threshold signal UL and the lower-limit threshold signal LL, based on the upper-limit comparison signal UE and the lower-limit comparison signal LE, the peak detection signal PC is determined to be invalid. Accordingly, when the signal level of the playback signal RS is greater than that of the upper-limit threshold signal UL or less than that of the lower-limit threshold signal LL, the read signal RD is generated based on the valid peak detection signal PC, and is outputted from the pulse adjustment circuit 47.

The operation of the peak detection circuit is described below with reference to FIG. 2. FIG. 2A shows the playback signal RS and the delayed playback signal RSD, which is delayed for the predetermined time τ from the playback signal RS.

When the signal level of the playback signal RS is less than that of the delayed playback signal RSD at point t21, the comparison signal CRS2, shown in FIG. 2B which is provided from the comparator 48, is inverted from the high level H to the low level L. The peak detection signal PC shown in FIG. 2C is generated synchronously with the inversion of the comparison signal CRS2. At that point, the peak detection signal PC is determined to be valid since the signal level of the playback signal RS is greater than that of the upper-limit threshold signal UL.

When the signal level of the playback signal RS is greater than that of the delayed playback signal RSD at point t22, the comparison signal CRS2, shown in FIG. 2B, which is provided from the comparator 48, is inverted from the low level L to the high level H. The peak detection signal PC is generated synchronously with the inversion of the comparison signal CRS2. At that point, the peak detection signal PC is determined to be valid since the signal level of the playback signal RS is less than that of the lower-limit threshold signal LL.

When the comparator 46 makes an incorrect determination, due to noise and so on, that the signal level of the playback signal RS is less than that of the delayed playback signal RSD at point t23, the comparison signal CRS2 is inverted from the high level H to the low level L and the peak detection signal PC is generated. At that point, the peak detection signal PC is determined to be invalid since the signal level of the playback signal RS falls within the range between the upper-limit threshold signal UL and the lower-limit threshold signal LL.

The read signal RD shown in FIG. 2D is generated using the valid peak detection signal PC.

According to the present invention, the peak detection signal PC can be easily generated without adjustment of the characteristic of the differentiator. Further, the peak detection signal PC can be generated independently of influence from a change in frequency and in signal level of the playback signal RS because the playback signal RS is compared with the delayed playback signal RSD. The error-free read signal RD can be outputted from the pulse adjustment circuit 47 because the peak detection signal PC is determined to be invalid even if the result of the comparison is accidentally inverted due to noise when the signal level of the playback signal RS falls within the range between the upper-limit threshold signal UL and the lower-limit threshold signal LL.

Figure 1C:
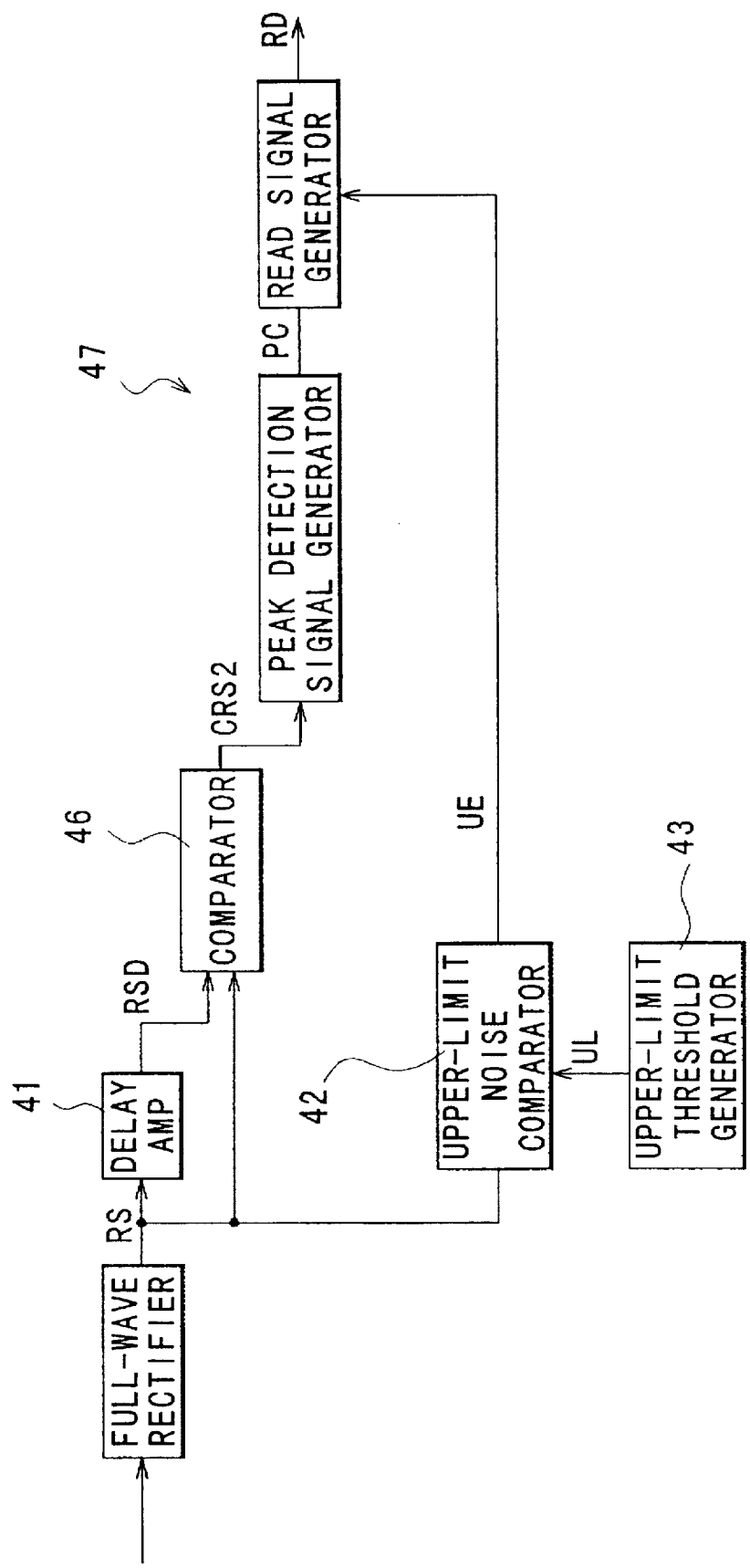
FIG. 1C is a block diagram of a modified form of peak detection circuit.

Further, in the above embodiment, when a full-wave rectified playback signal RS is supplied to the delay amplifier 41 and the comparator 46, the peak detection circuit can be constructed without using the lower-limit noise comparator 44 and the lower-limit threshold generator 45, as shown in FIG. 1C. When the delayed playback signal RSD is supplied to the upper-limit noise comparator 42 and the lower-limit noise comparator 44, or when the full-wave rectified playback signal RS or the signal provided from the delay amplifier 41 receiving the signal RS is supplied to the upper-limit noise comparator 42, the peak detection signal PC can also be determined to be valid or invalid, and accordingly, it can be determined from these signals whether or not the signal level of the playback signal RS falls within the range between the predetermined levels.

Further, the signal supplied to the peak detection circuit is not limited to the playback signal from the magnetic storage medium, and may include, for example, a playback signal from an optical-magneto disk. Accordingly, the peak detection circuit can be used not only for the magnetic storage medium playback apparatus, but also for other storage medium playback apparatus.

The read signal RD based on the peak detection signal PC is supplied to a peak shift correction circuit for correcting the peak shift described above. The construction of a peak shift correction circuit in a preferred embodiment according to the present invention is described below with reference to FIG. 3.

The read signal RD is supplied to a data pulse width correction block 51, and is converted into a signal RDC having a predetermined width (for example, 62.5 ns), based on a reference clock signal CLK1 provided from a reference clock generation circuit 75 described below. The converted read signal RDC is supplied to an 8-bit shift register 52. Shift registers 53 to 63 described below are also 8-bit shift registers. Although not shown, the reference clock signal CLK1 is not only supplied to the data pulse width correction block 51, but also supplied to the shift registers 52 to 63, pattern correction blocks 70 and 71, and a data separator 73.

The converted read signal RDC supplied from the data pulse width correction block 51, is successively transmitted through the shift registers 52 to 55, based on the reference clock signal CLK1, and is outputted as 8-bit parallel data from each of the shift registers 52 to 55. The converted read signal RDC transmitted in order from the shift register 54 is supplied to the shift register 55 and also to the pattern correction block 70. The parallel data outputted from the shift registers 52 to 55 are supplied to a pattern detection block 72.

In the pattern correction block 70, the converted read signal RDC is transmitted in order to the shift register 58, based on the reference clock signal CLK1, in a fashion similar to that for the shift registers 52 to 55.

The converted read signal RDC supplied to the shift register 56 is transmitted successively through the shift registers 56 to 60, based on the reference clock signal CLK1, and is outputted as 8-bit parallel data from each of the shift registers 58 to 60. The converted read signal RDC transmitted in order from the shift register 59 is supplied to the shift register 60 and to the pattern correction block 71. The parallel data outputted from the shift registers 58 to 60 are supplied to a pattern detection block 72.

In the pattern correction block 71, the converted read signal RDC is transmitted in order to the shift register based on the reference clock signal CLK1. The converted read signal RDC is transmitted successively through the shift registers 61 to 63 and is outputted as 8-bit parallel data from each of the shift registers 61 to 63 to the pattern detection block 72.

In the pattern detection block 72, it is determined from the parallel data supplied from the shift registers 52 to 59 whether or not the converted read signal RDC corresponds to a signal pattern which causes the peak shift. When the signal RDC is determined to be a signal pattern which causes the peak shift, a correction signal PA1 is provided to the pattern correction block 70.

In the pattern correction block 70, the converted read signal RDC supplied from the shift register 54 is replaced by a signal for which time intervals are corrected, based on the correction signal PA1. The replaced signal is transmitted in order as a corrected converted read signal RDC to the shift register 56.

Further, in the pattern detection block 72, it is determined from the parallel data supplied from the shift registers 58 to 63 whether or not the converted read signal RDC corresponds to the signal pattern which causes the peak shift. When it is determined that the signal RDC corresponds to the signal pattern which causes the peak shift, a correction signal PA2 is provided to the pattern correction block 71.

In the pattern correction block 71, the converted read signal RDC supplied from the shift register 59 is replaced by a signal for which time intervals are corrected, based on the correction signal PA2. The replaced signal is transmitted in order as a corrected converted read signal RDC to the shift register 61 and the data separator 73.

In the pattern detection block 72, it is determined based on the parallel data supplied from the shift registers 52 to 59 whether or not the converted read signal RDC corresponds to a signal pattern for the synchronizing signal in the format configuration shown in FIG. 7. When it is determined that the signal RDC corresponds to the signal pattern of the synchronizing signal, the synchronizing signal SC is demodulated and is supplied to the reference clock generation circuit 75. The reference clock generation circuit 75 is described later.

The operation of the peak shift correction circuit is described below in reference to FIG. 4 and FIG. 5.

Referring to FIG. 4 and FIG. 5, FIG. 4A and FIG. 5A show the shift registers 52 to 63 and the pattern correction blocks 70 and 71. When the data is played back from the magnetic storage medium, the converted read signal RDC is successively transmitted through the shift registers 52 to 63 synchronously with the reference clock signal CLK1. Because the shift registers 52 to 63 are 8-bit shift registers, when the reference clock signal CLK1 is 62.5 ns, the converted read signal RDC, with a period of 0.5 μs, is outputted as a parallel data from each of the shift registers 52 to 63.

The converted read signal RDC is successively transmitted, and as shown in FIG. 4B, when the output from the fifth stage of the shift register 52 is set to the high level H and the pattern detection block 72 detects the signals at the high level H with regard to the output of parallel data from each of the shift registers 54, 56, and 58, and when there is no signal for the high level H in the parallel data from the shift registers 53, 55, 57, and 59, it is determined that the converted read signal RDC corresponds to the signal pattern of the synchronizing signal. At that point, the synchronizing signal SC is demodulated from the converted read signal RDC, and is supplied to the reference clock generation circuit 75.

Figure 12A:
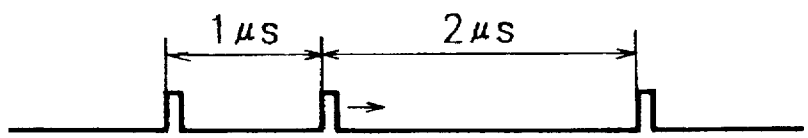
FIG. 12A–12F form a diagram showing signal patterns which cause peak shifts.

As shown in FIG. 4C, when the output from the fifth stage of the shift register 53 is set to the high level H and the pattern detection block 72 detects the signals at the high level H with regard to the output of parallel data outputted from the shift registers 55 which is prior to the shift register 53 by 1 µs and from the shift registers 59 which is prior to the shift register 55 by 2 µs and when there is no signal for the high level H in the parallel data outputted from each of the shift registers 52, 54, 56, 57, and 58 (corresponding to the signal pattern shown in FIG. 12A which causes the peak shift), the signal of the pattern correction block 70 is changed into the signal for the time intervals which are corrected as shown in FIG. 4D. The changed signal is transmitted in order to the shift register 56.

Figure 12B:
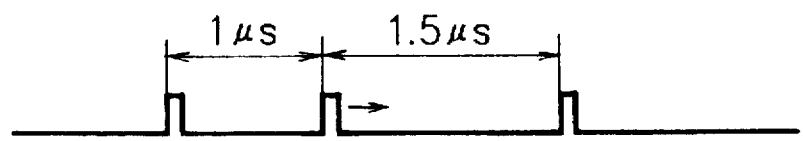

Similarly, FIG. 4E shows the signal corresponding to the signal pattern shown in FIG. 12B which causes the peak shift. When the output from the fifth stage of the shift register 53 is set to the high level H and the pattern detection block 72 detects the signals at the high level H with regard to the parallel data outputted from the shift registers 55 and 58 and there is no signal for the high level H in the output of parallel data from each of the shift registers 52, 54, 56, 57, and 59, the signal of the pattern correction block 70 is changed into a signal for the time intervals which are corrected as shown in FIG. 4F.

Figure 12C:
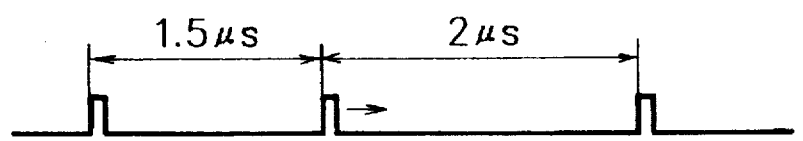

FIG. 4G shows the signal corresponding to the signal pattern shown in FIG. 12C which causes the peak shift. When the output from the fifth stage of the shift register 52 is set to the high level H and the pattern detection block detects the signals at the high level H with regard to the output of parallel data from the shift registers 55 and 59 and there is no signal for the high level H with regard to the output of parallel data from each of the shift registers 53, 54, 56, 57, and 58, the signal of the pattern correction block 70 is changed into a signal for the time intervals which are corrected as shown in FIG. 4H.

Figure 12D:

FIG. 5B shows the signal corresponding to the signal pattern shown in FIG. 12D which causes the peak shift. When the output from the fifth stage of the shift register 62 is set to the high level H and the pattern detection block 72 detects the signals at the high level H with regard to the output of parallel data outputted from the shift registers 56 and 60 and no signal at the high level H in the parallel data outputted from each of the shift registers 57, 58, 59, and 61, the signal of the pattern correction block 71 is changed into a signal of which time intervals are corrected as shown in FIG. 5C. The changed signal is transmitted in order to the shift register 61 and the data separator 73.

Figure 12E:
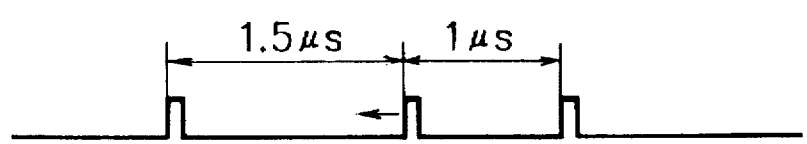

FIG. 5D shows the signal corresponding to the signal pattern shown in FIG. 12E which causes the peak shift. When the output from the fifth stage of the shift register 62 is set to the high level H and the pattern detection block 72 detects the signals at the high level H with regard to the output of parallel data from each of the shift registers 57 and 60 and no signal at the high level H in the parallel data outputted from each of the shift registers 56, 58, 59, and 61, the signal of the pattern correction block 71 is changed into a signal for the time intervals which are corrected as shown in FIG. 5E.

Figure 12F:
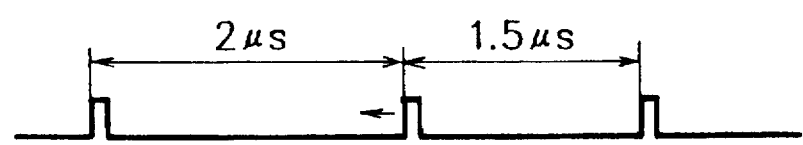

FIG. 5F shows the signal corresponding to the signal pattern shown in FIG. 12F which causes the peak shift. When the output from the fifth stage of the shift register 63 is set to the high level H and the pattern detection block 72 detects the signals at the high level H with regard to the output of parallel data outputted from the shift registers 56 and 60 and when there is no signal for the high level H in the parallel data outputted from each of the shift registers 57, 58, 59, 61, and 62, the signal of the pattern correction block 71 is changed into a signal for the time intervals which are corrected as shown in FIG. 5G.

As described above, the converted read signal RDC based on the peak detection signal PC is successively transmitted through the shift registers 52 to 63, the signal pattern is detected by the pattern detection block 72 based on the parallel data outputted from the shift registers 52 to 63, and when the pattern detection block 72 detects the signal pattern which causes the peak shift, the time interval of the peak detection signal is appropriately corrected. Accordingly, the peak shift can be corrected with inexpensive construction without the use of the differentiator 5, the integrator 6, and the direct current generator 7 of the prior art.

Further, the pattern detection block 72 detects the signal pattern which causes the peak shift, discriminating between two groups of signal patterns which cause the signal to shift forward and backward, and the time interval of the signal is corrected for each group by the pattern correction blocks 70 and 71. This makes the construction simple, eliminating the pattern correction blocks for each of the signal pattern which causes the peak shift.

Moreover, because the pattern correction blocks 70 and 71 are provided among the shift registers 52 to 63 and the time interval of the signal is corrected during transmission of the signal, the correction of the time interval can be performed without any delay of the signal.

Although in the embodiment described above, the signal pattern is detected in reference to the signal at the high level H outputted from the fifth stage of the shift registers 52, 53, 62, and 63, the referred signal is not limited to the output from the fifth stage. The signal is not limited to the signal modulated in the MFM method, and the time interval in signals modulated in other methods can be easily corrected when the signal pattern to be detected by the pattern detection block 71 is changed.

FIG. 6 shows construction of a reference clock generation circuit 75 in a preferred embodiment. Reference character 76 denotes a pulse interval time measurement block. The pulse interval time measurement block 76 receives a synchronizing signal SC supplied from the pattern detection block 72, and the reference clock signal CLK1 supplied from a resistance value control oscillator 78, and counts a pulse time interval in the synchronizing signal SC. The count data is latched and supplied to a converter 77. The latched count data is stored until it is updated by the count data based on the synchronizing signal for the following sector.

The converter 77 generates a resistance value based on the count data. The resistance value control oscillator 78 controls the frequency of the reference clock signal CLK1, based on the resistance value from the converter 77, so as to make such frequency equal to the frequency of the synchronizing signal SC multiplied by, for example, 16.

Accordingly, when the synchronizing signal SC is supplied in a short period or when its cycle is changed, the pulse interval is automatically measured, and it is possible to control the frequency of the reference clock signal CLK1 so as to make it equal to the frequency of the synchronizing signal SC multiplied by a predetermined number.

The signal supplied to the reference clock generator is not only limited to the synchronizing signal played back from the magnetic storage medium, but can also be the other kinds of digital signals.

The data separator 73 which receives the converted read signal RDC from the pattern correction block 71 shown in FIG. 3, generates the data window signal WP, based on the reference clock signal CLK1 supplied from the reference clock generator 75. A data pulse is separated from the converted read signal RDC, based on the data window signal WP, so that a data pulse signal DP is generated. A data signal DT is generated based on the data pulse signal DP.

As described above, when the peak detection circuit and the peak shift correction circuit are used in the recording playback apparatus or in the magnetic storage medium playback apparatus, these circuits allows a digital signal to be accurately played back without troublesome adjustment, independently of the effects of noise or changes in frequency or in signal level of the playback signal.

According to the present invention, the signal level of an input signal is compared with the signal level of the delayed input signal provided from a signal delay means, and a peak detection signal is generated by a peak detection signal generation means when the result of the comparison is inverted. Accordingly, the peak detection signal can be easily generated without necessary adjustment of a characteristic of a differentiator. Further, the peak detection signal can be generated independently of any effects of a change in frequency or in signal level of the playback signal because the input signal is compared with the delayed input signal.

Further, according to the present invention, the signal level of a full-wave rectified input signal which is generated from the input signal with a full-wave rectification means, is compared with the signal level of the delayed full-wave rectified input signal provided from the signal delay means, and the peak detection signal is generated by the peak detection signal generation means when the result of the comparison is inverted. Accordingly, the peak detection signal can be easily generated without necessary adjustment of a characteristic of a differentiator. Further, the peak detection signal PC can be generated independently of any effects of a change in frequency or in signal level of the playback signal because the full-wave rectified input signal is compared with the delayed full-wave rectified input signal.

Moreover, according to the present invention, when the signal level of the input signal falls within a predetermined range, a peak detection signal determination means determines the peak detection signal generated in the peak detection signal means to be invalid. Accordingly, even if the result of the comparison is accidentally inverted due to noise when the signal level of the playback signal falls within the range between predetermined levels, an error-free peak detection signal can be generated because the peak detection signal is determined to be invalid. When a determination is made, based on the full-wave rectified signal, whether or not the signal level of the input signal falls within the range between predetermined levels, the signal levels for the determination are easily set when only one signal level is defined, and this makes the peak detection signal determination means simple.

Moreover, according to the present invention, the signal level of a playback signal from a storage medium is compared with the signal level of the delayed playback signal provided from a signal delay means, and a playback digital signal is obtained based on a peak detection signal generated by a peak detection signal generation means when the result of the comparison is inverted. Accordingly, the peak detection signal can easily be generated without necessary adjustment of a characteristic of a differentiator. Further, the peak detection signal can be generated independently of any effects of a change in frequency or in signal level of the playback signal.

Moreover, according to the present invention, when the signal level of the input level of the playback signal falls within a predetermined range, a peak detection signal determination means determines the peak detection signal generated in the peak detection signal means to be invalid. Accordingly, even if the result of the comparison is accidentally inverted due to noise when the signal level of the playback signal falls within the range between predetermined levels, a playback digital signal is obtained because the peak detection signal is determined to be invalid.

It will be obvious to those having skill in the art that many changes may be made in the above-described details of the preferred embodiment of the present invention. The scope of the present invention, therefore, should be determined by the following claims.

What is claimed is:

1. A peak detection circuit for receiving an input signal and providing a peak detection signal having peak detection events for positive and negative peaks of the input signal, said peak detection circuit comprising:

full-wave rectification means for performing full-wave rectification of the input signal in order to provide a full-wave rectified input signal, signal delay means for delaying the full-wave rectified input signal by a predetermined time in order to provide a delayed full-wave rectified input signal, and peak detection signal generating means for comparing the signal level of the full-wave rectified input signal with the signal level of the delayed full-wave rectified input signal and generating a peak detection event when the result of the comparison is inverted.

2. A peak detection circuit according to claim 1, comprising validation means for providing a validation signal based on the signal level of the full-wave rectified input signal, and output means receiving the peak detection event and the validation signal and providing a validated peak detection event if the validation signal indicates that the signal level of the full-wave rectified input signal is outside a predetermined range.

3. A peak detection circuit according to claim 2, wherein the validation means comprises a threshold generator which supplies a threshold signal, and a noise comparator which receives both the full-wave rectified input signal and the threshold signal and provides the validation signal in a first state, indicating that a peak detection event is valid, when the signal level of the full-wave rectified input signal is greater than the signal level of the threshold signal, and otherwise provides the validation signal in a second state.

4. A peak detection circuit according to claim 1, comprising validation means for providing a validation signal based on the signal level of the full-wave rectified input signal, and wherein the peak detection signal generation means is responsive to the validation signal and generates a peak detection event when the result of the comparison is inverted and the validation signal indicates that the signal level of the full-wave rectified input signal is outside a predetermined range.

5. A peak detection circuit according to claim 4, wherein the validation means comprises a threshold generator which supplies a threshold signal, and a noise comparator which receives both the full-wave rectified input signal and the threshold signal and provides the validation signal in a first state, indicating that a peak detection event is valid, when the signal level of the full-wave rectified input signal is greater than the signal level of the threshold signal, and otherwise provides the validation signal in a second state.

6. A peak detection circuit according to claim 1, wherein the peak detection events of the peak detection signal are pulses.

7. A peak detection circuit for receiving an input signal and providing a peak detection signal having validated peak detection events for positive and negative peaks of the input signal, said peak detection circuit comprising:

signal delay means for delaying the input signal by a predetermined time in order to provide a delayed input signal, validation means for providing a validation signal based on the signal level of the input signal, the validation signal indicating whether the signal level is above an upper limit or below a lower limit, and peak detection signal generating means for comparing the signal level of the input signal with the signal level of the delayed input signal and generating a validated peak detection event when the result of the comparison is inverted and the validation signal indicates that the signal level of the input signal is outside the range between the lower limit and the upper limit.

8. A peak detection circuit according to claim 7, wherein the validation means comprises an upper-limit threshold generator and a lower-limit threshold generator, which supply an upper-limit threshold signal and a lower-limit threshold signal respectively, and an upper-limit noise comparator and a lower-limit noise comparator which receive the upper-limit and lower-limit threshold signals respectively and each of which also receives the input signal, and wherein the upper-limit and lower-limit noise comparators provide said validation signal in a first state when the signal level of said input signal is greater than the signal level of the upper-limit threshold signal, in a second state when the signal level of said input signal is less than the signal level of the lower-limit threshold signal, and in a third state, indicating that a peak detection event is invalid, when the signal level of the input signal is between the signal levels of the upper-limit threshold signal and the lower-limit threshold signal.

9. A peak detection circuit according to claim 7, wherein the peak detection signal generating means generates an unvalidated peak detection event when the result of the comparison is inverted and the peak detection signal generating means includes output means for receiving the unvalidated peak detection event and the validation signal and generating the validated peak detection event when the validation signal indicates that the unvalidated peak detection event is valid.

10. A peak detection circuit according to claim 7, wherein the validated peak detection events of the peak detection signal are pulses.

11. A method for detecting positive and negative peaks in an input signal, comprising the steps of:
(a) full-wave rectifying the input signal to provide a full-wave rectified input signal,
(b) delaying the full-wave rectified input signal by a predetermined time in order to provide a delayed full-wave rectified input signal,
(c) comparing the signal level of the full-wave rectified input signal with the signal level of the delayed full-wave rectified input signal, and
(d) generating a peak detection event when the result of comparing the signal level of the full-wave rectified input signal with the signal level of the delayed full-wave rectified input signal is inverted.

12. A method according to claim 11, comprising generating a validation signal based on the signal level of the full-wave rectified input signal and wherein step (d) comprises generating a peak detection event only when the result of comparing the signal level of the full-wave rectified input signal with the signal level of the delayed full-wave rectified input signal is inverted and the validation signal indicates that the signal level of the full-wave rectified input signal is outside a predetermined range.

13. A method according to claim 11, further comprising generating a validation signal based on the signal level of the full-wave rectified input signal, and generating a validated peak detection event in response to the peak detection event generated in step (d) if the validation signal indicates that the signal level of the full-wave rectified input signal is outside the predetermined range.

14. A method for detecting positive and negative peaks in an input signal, comprising the steps of,
(a) delaying the input signal by a predetermined time in order to provide a delayed input signal,
(b) generating a validation signal based on the signal level of the input signal, the validation signal indicating whether the signal level is above an upper limit or below a lower limit,
(c) comparing the signal level of the input signal with the signal level of the delayed input signal and generating a peak detection signal which includes a validated peak detection event when the result of the comparison is inverted and the validation signal indicates that the signal level of the input signal is outside the range between the lower limit and the upper limit.

15. A method according to claim 14, comprising generating an unvalidated peak detection event when the result of the comparison is inverted and generating a validated peak detection event in response to an unvalidated peak detection event when the validation signal indicates that the signal level of the input signal is outside said range.

* * * * *